March 2, 1954 J. A. VERNON 2,670,544
INSTRUMENT FOR LAYING OUT WORKPIECES THREE-DIMENSIONALLY
Filed April 1, 1953
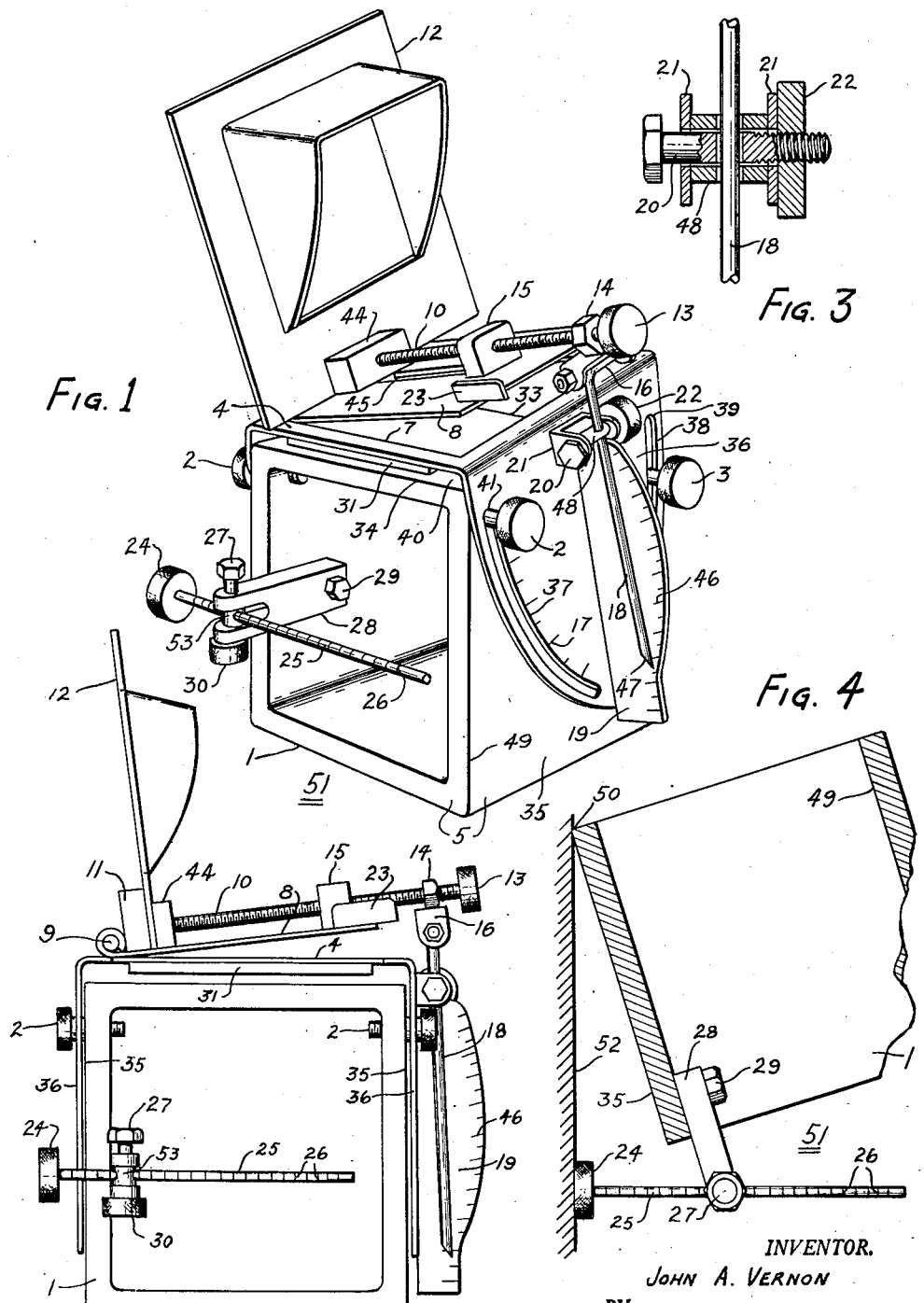
INVENTOR.
JOHN A. VERNON
BY M. O. Hayes
ATTORNEY Patented Mar. 2, 1954

2,670,544

UNITED STATES PATENT OFFICE 2,670,544

INSTRUMENT FOR LAYING OUT WORK-PIECES THREE-DIMENSIONALLY

John A. Vernon, Philadelphia, Pa.

Application April 1, 1953, Serial No. 346,289

7 Claims. (Cl. 33—174)

(Granted under Title 35, U. S. Code (1952), sec. 266)

The invention described herein may be manufactured and used by or for the Government of the United States of America for governmental purposes without the payment of any royalties thereon or therefor.

This application is a continuation in part of my application, Serial No. 625,424, filed October 29, 1945, now abandoned.

The present invention pertains to the art of making workpiece layouts, as practiced in manufacturing plants and the like. The principles of the invention are embodied in a simple and low-cost modification of a standard box parallel, and more particularly the invention is embodied in a layout device that is operable to hold a workpiece for three-dimension layout measurements. The instrument of the invention permits a quick and accurate inspection or setup of a workpiece and may be embodied in any available box parallel.

Inspectors, toolmakers and machinists often use the common adjustable knee in checking or setting up the alignment of any piece of work. These knees have a surface to which work can be clamped and which surface can be tilted to any desired angle as indicated on a vernier scale. However, commercial knees have only one angle of adjustment, necessitating a separate setup for each angle on compound angle fittings. This slows up quantity production and causes variations in product.

By using the device of the present invention it is possible to set up work to one, two, or three angles, for three-dimension measurements, adjustments for at least one dimension being enabled alternatively through oppositely directed angles. This is particularly advantageous in the manufacture of large quantities of aircraft or other workpieces which combine longitudinal, transverse and vertical angles. Every workpiece can be identical and correct at one setting. Furthermore, the device of the present invention may in many instances eliminate the delay and expense of making special jigs and fixtures.

A further advantage of this invention is that it obviates the need for the ordinary one-angle adjustable knee by being attachable to the common box parallel.

A further object is to provide an adjustable knee having the features and characteristics set forth and provided with a work-supporting platform and a work-holding clamp.

A still further object of the invention is to provide three graduated scales thereon so that any angle can be accurately set to the required degree.

The principles of the invention and its advantages will be more fully understood from the disclosure of a practical embodiment thereof in the accompanying drawings, in which Fig. 1 is a perspective of a device embodying the present invention, Fig. 2 is a front elevation of the device of Fig. 1, Fig. 3 is a detailed cross-sectional elevation, taken on line 3—3 of Fig. 2, and Fig. 4 is a cross-sectional plan, taken on line 4—4 of Fig. 2.

Box parallel, Figs. 1, 2 and 4, is a standard commercial product, of which all surfaces 5 are precisely flat and rectangular, and in which each surface 5 is disposed precisely at right angles to every other of its adjacent surfaces 5. When the box parallel 1 is in position for practice of the invention, it rests on the flat surface 51 of a surface plate for example. Top face 40 of the several surfaces 5 constitutes a datum surface, and platen 4 is mounted on the box parallel 1 to be movable into or out of parallel relationship with datum surface 40.

Panels 36 project downwardly away from respective opposite edges of the platen 4, and these comprise each the arcuate slots 37 and 38. A thumb screw 2 is projected through each slot 37, and similarly a thumb screw 3 is projected through each slot 38, the several screws 2 and 3 being threaded into opposite faces 35 of the box parallel 1 that are perpendicular to datum surface 40, to secure platen 4 to the box parallel. Panels 36 are respective opposite side panels of the platen 4, and are positioned each adjacent to a side face 35 of the box parallel. Screws 2 are a set of two for respective opposite arcuate slots 37, are disposed in coaxial alignment, and are perpendicular to the parallel planes of opposite side faces 35. Similarly, screws 3 are a set of two for respective opposite slots 38, are disposed in coaxial alignment, and are perpendicular to the parallel planes of opposite side faces 35.

The upper ends 39 of the set of opposite slots 38 of the several opposite panels 36 bear each on a screw 2 of the set, and constitutes a bearing on which the platen 4 may swing alternatively into or out of parallel with datum surface 40. The several arcuate slots 37 describe each an arc on the axis of bearing 39 as a center, and constitute guideways along which their screws 2 travel when platen 4 swings on the common axis of screws 3. Scale 17 along slot 37 serves for reading the angular displacement of platen 4 when it is rotated on the common axis of its bearings 39.

In a similar manner, the upper ends 41 of the set of slots 37 of the several panels 36 bear each on a screw 2 of the set, and constitutes a bearing on which the platen 4 may swing alternatively into or out of parallel with datum surface 40. The several arcuate slots 38 describe each an arc on the axis of bearing 41 as center, and constitute guideways along which their screws 3 travel. A scale along a slot 38, and similar to scale 17, may be provided for reading angular displacement of platen 4 when it is rotated on the common axis of its bearings 41.

The axes of the several sets of screws 2 and 3 are parallel to each other, and parallel to the corner edges 33 and 34 of the box parallel 1, corner edges 33 and 34 being opposite end edges of the datum surface 40. The platen 4 may be rotated on either of two angles alternatively, of the respective sets of pins 2 and 3, the two angles of rotation being directed oppositely with reference to datum surface 40.

When both sets of bearings 41 and 39 of respective slots 37 and 38 bear upon their companion sets of pivot pins 2 and 3 respectively, platen 4 is held in position parallel with the datum face 40 of box parallel 1.

Plate 8 is mounted on platen 4, to swing on the hinge pin 9 into and out of the plane of platen 4. Cutout 7 of platen 4 contains plate 8 when it is positioned in the plane of platen 4, and stop 23, Figs. 1 and 2, bears against the top surface of platen 4 to hold plate 8 in the plane of the platen.

Plate 8 comprises a rest or platform on which a workpiece 12 bears when it is supported by the layout instrument of the present invention.

Block 11, Fig. 2, is rigidly secured to plate 8 to constitute a fixed jaw of a clamp or vise, of which companion member 44 is the movable jaw. Movable jaw 44 is guided by the slot 45 in the plate 8 to traverse towards or away from the fixed jaw 11 by means of the traversing screw 10 threaded through nut 15 which is rigidly secured to plate 8 by welding or the like. The knurled head 13 of traversing screw 10 may be rotated manually to clamp a workpiece 12 in, or release it from, the jaws 11 and 44.

The axis of hinge pin 9 is at right angles to the parallel axes of the sets of bearing ends 41 and 39 of respective sets of slots 37 and 38, and at right angles to the corner edge 34 of the box parallel 1. Thus, in addition to the angular displacement of workpiece 12 alternatively along oppositely directed angles with reference to datum face 40 by means of the respective several sets of trunnions 2 and 3, the workpiece 12 may be displaced along an angle at right angles to each of the angles of axes 2 and 3 with reference to datum face 40, and this constitutes an angle of a second co-ordinate of three-dimensional adjustment.

Nut 14 is threaded on traverse screw 10, and carries the clevis or bracket 16 secured thereto, from which pointer rod 18 is pivotally suspended to extend downwardly alongside one of the panels 36. Clevis or bracket 21 is secured to the side panel 36 by welding or the like, and bolt 20 is carried by the bracket 21. See Fig. 3. Rod 18 passes through bolt 20 transversely, and through the sleeve 48 that fits around the bolt. Rod 18 slides lengthwise through the bolt 20 and sleeve 48 when plate 8 swings towards or away from the plane of platen 4 on the axis of hinge pin 9. Nut 22 of bolt 20 is tightened to clamp the rod 18 and hold it in position of lengthwise adjustment, thereby holding the workpiece 12 in position of angular displacement with reference to datum face 40 around the axis of pivot 9.

Gage plate 19 is secured by welding or the like to the same side panel 36 that carries the clevis 21, and extends along the path described by the tip 47 of rod 18 when the plate 8 swings on hinge pin 9. Scale 46, along the edge of gage plate 19, is preferably calibrated to uniform increments of angular displacement of the plate 8 around the axis of hinge pin 9. The tip 47 of rod 18 constitutes a pointer that indicates the angle of displacement of workpiece 12 with reference to datum face 40 on the axis of hinge pin 9.

It will be noted that the nut 14 travels along the traverse screw 10 when the screw is adjusted to clamp a workpiece 12 in jaws 11 and 44. Thus, nut 14 maintains a fixed position with reference to the stationary nut 15, and also with reference to the axis of hinge pin 9. The center of rotation of pointer rod 18 therefore is not displaced with reference to the axis of hinge pin 9 constituting the center of rotation of plate 8, and readings along the scale 46 are accurate for any setting of movable jaw 44 in accordance with workpiece 12 of given thickness.

Plate 8 is large enough to include almost the entire area of platen 4, leaving only a narrow margin of metal along its edges outside the cutout 7. Panels 36 serve to reinforce two of the opposite edges of panel 4. There is a deficiency of metal along the other two opposite edges, which is reinforced by strips 31 welded along the bottom surface of the platen to prevent it from sagging under the weight of its load.

For angular displacement around the third coordinate of three-dimensional adjustment, box parallel 1 is rotated on corner edge 50, Fig. 4, as a center of rotation, which is diagonally opposite the corner edge 49 that is seen in Fig. 1.

There is attached to the face 51 of the surface plate on which the box parallel 1 rests, an angle plate that provides the upright surface 52 disposed perpendicular to the surface 51. The corner edge 50, which is perpendicular to the datum face 40, engages the upright surface 52 and serves as a vertical center of rotation 50 for the box parallel 1. The angle seen in Fig. 4 between face 35 of box parallel 1 and upright surface 52 is the angle of displacement around the corner edge 50.

The instrument of the disclosed embodiment includes the rod 25 for reading the angular displacement on corner edge 50 as the axis of rotation. Rod 25 is positioned along an end face of box parallel 1 between, and perpendicular to, opposite side faces 35, and projects beyond one of the faces 35 into abutting engagement with the upright surface 52.

Bracket 28 is secured to the box parallel 1 by means of the cap screw 29 for example to project beyond an end face thereof. Shaft 27 is journaled in bracket 28 on an axis which is parallel with the side face 35 and perpendicular to the datum face 40. Rod 25 passes transversely through the shaft 27 perpendicular to the axis thereof, and through the sleeve 53 around the shaft, comprising a guideway for lengthwise travel of the rod 25 that is perpendicular to the axis of shaft 27. Head 24 of rod 25 comprises an end face for the rod that is at right angles to its length. Thus, when the head 24 abuts against the upright surface 52 as illustrated in Fig. 4, the rod 25 thereby projects perpendicularly away from upright surface 52.

Shaft 27 is in the form of a bolt, and the thumb nut 30 is threaded thereto. The thumb nut 30 may be tightened for clamping rod 25 in position of its lengthwise adjustment by means of the sleeve 53, the clamping action being similar to that of the structure shown in Fig. 3.

Rod 25 is provided with a graduated scale 26 along its length, which preferably is calibrated to equal increments of angular displacement of the box parallel 1 around the center of rotation of the corner edge 50 in engagement with the upright surface 52. With the thumb nut 30 retracted, the rod 25 is adjusted lengthwise to the desired angle of displacement with reference to the ordinate of corner edge 50 as determined by the scale 26. The nut 30 is then tightened. With the head 24 bearing squarely against surface 52, and the corner 50 also abutting against surface 52, the workpiece 12 is thus set to the third angle of displacement with reference to datum face 40, which constitutes a third co-ordinate of three-dimensional adjustment.

The workpiece 12 was arbitrarily selected to illustrate the principles, operation and use of the device of the present invention. It will be obvious that the invention is not limited to the specific workpiece 12 that is shown.

While a particular embodiment of the invention has been illustrated and described herein, it is not intended that the invention be limited to such disclosure, and it is contemplated that changes and modifications therein and thereto may be made within the scope of the claims.

What is claimed is:

1. A work holder comprising a box parallel, a platen adjacent to a predetermined face of the box parallel and positionable in a plane parallel therewith, the box parallel comprising a pivotal mount for the platen to swing towards and away from the adjacent face of the box parallel, the pivotal axis of the platen being parallel with a datum edge of the adjacent face of the box parallel, a work-holding device, the platen comprising a pivotal mount for the work-holding device to swing towards and away from the plane of the platen, the pivotal axis of the work-holding device being at right angles to the pivotal axis of the platen when the platen is positioned parallel with its adjacent face of the box parallel, the pivotal mount for the platen being positioned in the box parallel adjacent a datum edge of the adjacent face of the box parallel, an alternative pivotal mount for the platen positioned in the box parallel adjacent to the edge of the adjacent face of the box parallel that is opposite the first datum edge, the axes of the several pivotal mounts being parallel with each other.

2. In a work holder as defined in claim 1, each of the pivotal mounts comprising a set of trunnions projecting from faces of the box parallel, the several trunnions of a set projecting from respective opposite faces that are opposite side faces with reference to the face of the box parallel adjacent to the platen, a pair of panels projecting from respective opposite edges of the platen and positioned along respective opposite side faces of the box parallel embodying the trunnions, each panel comprising an arcuate slot constituting a guideway for a trunnion to travel along, each slot extending from an end thereof near the platen along the panel in a direction away from the platen, the end of each slot that is nearest the platen comprising a bearing for its companion trunnion, the center of curvature of each slot being coincident with the trunnion bearing of the other slot.

3. In a work holder as defined in claim 2, a scale along the arc of each of the arcuate slots.

4. In a work holder as defined in claim 2, a pointer extending from the work-holding device along one of the panels, a scale along the panel proximate to the pointer extending along the path the pointer follows when the work-holding device swings towards or away from the plane of the platen.

5. In a work holder as defined in claim 1, a rod, the box parallel comprising a support for the rod securing it in position to project away from the plane of a face of the box parallel, the support comprising mechanism to adjust the extent that the rod projects, the face of the box parallel from the plane of which the rod projects being a side face with reference to the face of the box parallel adjacent to the platen.

6. In a work holder as defined in claim 5, the rod comprising a scale along its length to measure the lengthwise adjustment of the rod.

7. In a work holder as defined in claim 1, a straight rod, a mount for the rod comprising a shaft and a journal for the shaft secured to the box parallel with its axis perpendicular to the datum face of the box parallel, the shaft comprising a guideway at right angles to its axis for lengthwise adjustment of the rod, the rod comprising a head embodying a perpendicular end surface for the rod, and a clamp for holding the rod in position of lengthwise adjustment.

JOHN A. VERNON.

No references cited.